(12) United States Patent
Kim

(10) Patent No.: US 6,917,397 B2
(45) Date of Patent: Jul. 12, 2005

(54) CONNECTOR, BACKLIGHT ASSEMBLY LAMP UNIT INCLUDING THE CONNECTOR AND LIQUID CRYSTAL DISPLAY HAVING THE SAME

(75) Inventor: Young-Duk Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/092,513

(22) Filed: Mar. 8, 2002

(65) Prior Publication Data

US 2002/0197898 A1 Dec. 26, 2002

(30) Foreign Application Priority Data

Mar. 10, 2001 (KR) ........................................ 2001-12451

(51) Int. Cl.[7] ............................................ G02F 1/1335
(52) U.S. Cl. .......................................... 349/65; 439/744
(58) Field of Search ..................... 349/61, 65; 439/856, 439/857, 733.1, 744

(56) References Cited

U.S. PATENT DOCUMENTS 5,108,318 A * 4/1992 Sakurai et al. .............. 439/744
5,389,013 A * 2/1995 Kourimsky .................. 439/746
5,921,819 A * 7/1999 Lee ............................. 439/698
6,533,428 B1 * 3/2003 Ogo et al. ..................... 362/31

* cited by examiner

Primary Examiner—Robert H. Kim
Assistant Examiner—Richard H Kim
(74) Attorney, Agent, or Firm—McGuireWoods LLP

(57) ABSTRACT

A connector is provided for preventing a connection terminal inserted into a connector housing from being dislodged. The housing has a hanging projection formed at an inner bottom surface of a through hole and a body portion inserted into the through hole from one side opening of the through hole, for providing a power supply line. The body portion includes a joint portion for fixing the body portion to the power supply line, a head portion having a hanging jaw engaged with the hanging projection of the housing, and a connection portion formed with an inclination that is negatively inclined along its insertion direction and faces with the inner bottom surface of the housing, for connecting the head portion thereby connected with the joint portion. The connection portion acting as a lever does not allow movement of the hot or cold electrode line, and tensile stress due to repeated coupling of the connector is not transferred, undesirable dislodging of the connector terminal of the connector from the housing is prevented.

9 Claims, 11 Drawing Sheets

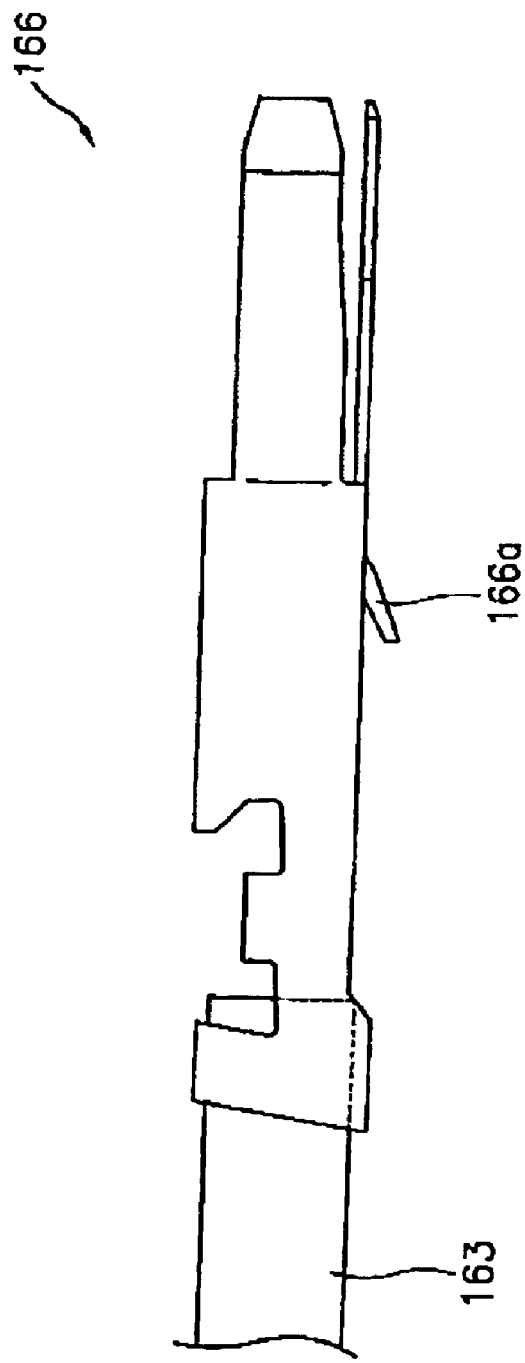

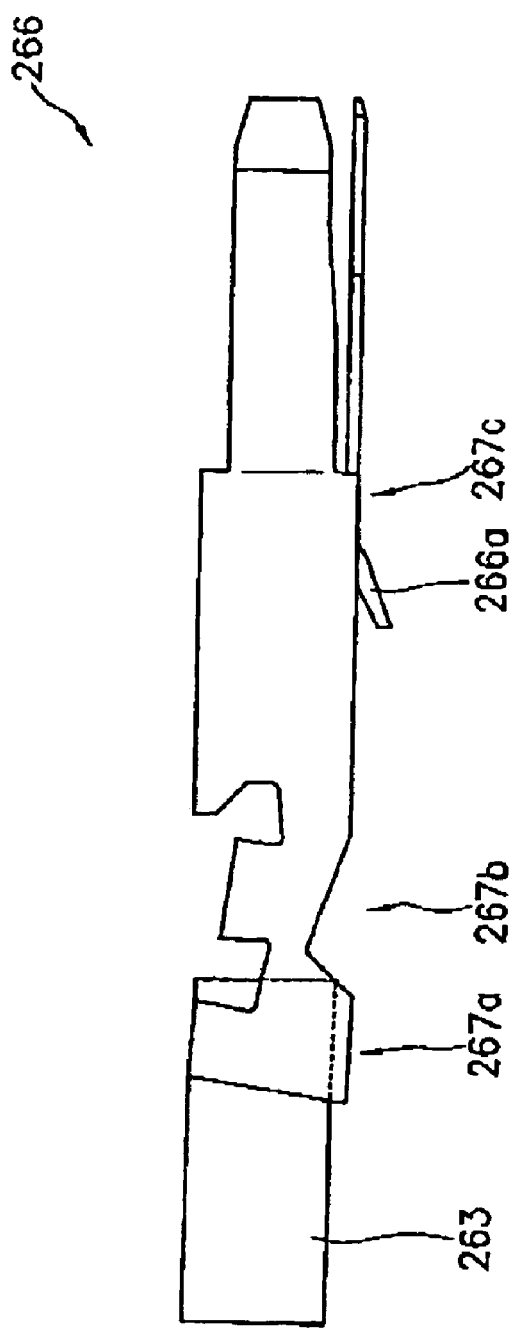

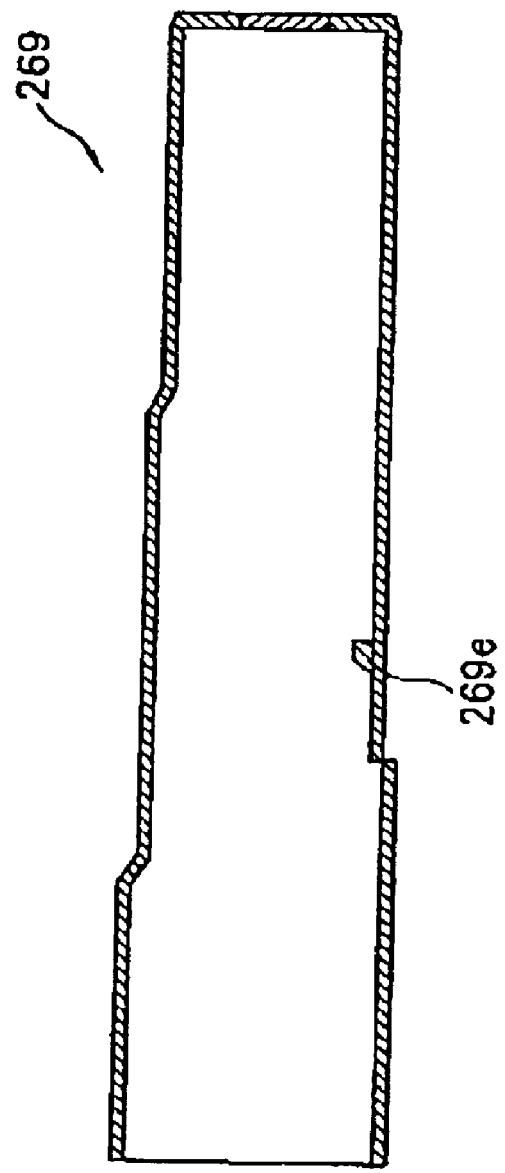

CONNECTOR, BACKLIGHT ASSEMBLY LAMP UNIT INCLUDING THE CONNECTOR AND LIQUID CRYSTAL DISPLAY HAVING THE SAME

BACKGROUND OF THE INVENTION

1. Field of the Invention

The present invention relates to a connector, and more particularly, to a connector capable of preventing a connector terminal inserted into the housing of the connector from being dislodged, a backlight assembly lamp unit and an LCD including the connector.

2. Description of the Related Art

Recently, with developments in the information industry, information processing units such as computers are advancing remarkably. Technical developments in the information processing units follow the advancement in the development of monitor devices displaying information output by the information processing units. Monitor devices are classified into two main types of displays, that is, Cathode Ray Tube (CRT) type monitor devices and liquid crystal display LCD type monitor device.

The small size, lighter weight and lower power consumption make the LCD devices specially suited to replace the traditional CRTs and to be widely used as a monitor for a portable computer, a desk-top computer and even a high picture quality image processing unit.

FIG. 1 is a simplified exploded perspective view of a conventional LCD.

Referring to FIG. 1, an LCD 100 includes an LCD module 130 for displaying pictures using image signals applied thereto, and a front case 110 and a rear case 120 accommodating the LCD module 130.

The LCD module 130 includes a display unit 170 having an LCD panel 171 for displaying pictures and a backlight assembly 150 for providing the display unit 170 with a light beam.

The display unit 170 includes an LCD panel 171, a gate PCB 175, a data PCB 176, a gate tape carrier package (TCP) 174 and a data TCP 178.

The LCD panel 171 includes a TFT substrate 172, a color filter substrate 173 and a liquid crystal (not shown) interposed between the TFT substrate 172 and the color filter substrate 173.

The TFT substrate 172 is a transparent glass substrate on which a plurality of thin film transistors (TFTs) are formed in a matrix configuration. Data lines are connected to source terminals of the TFTs and gate lines are connected to gate terminals of the TFTs. Also, drain terminals of the TFTs are connected to pixel electrodes of indium tin oxide (ITO) that is one kind of transparent conductive material.

The color filter substrate 173 is disposed facing the TFT substrate 172. The color filter substrate 173 includes R, G, B color pixels which have been manufactured by a thin-film manufacturing process, and a transparent common electrode of ITO.

As power is applied to the gate terminal and the source terminal of the TFT of the TFT substrate 172, the TFT is turned on. By turning on the TFT, an electric field is formed between the pixel electrodes of the TFT substrate 172 and the common electrode of the color filter substrate 173. The formed electric field varies a pre-tilt angle of liquid crystal molecules interposed between the TFT substrate 172 and the color filter substrate 173 and thus the optical transmission degree of the liquid crystal is varied, so that a desired image is obtained.

Meanwhile, in order to control an aligned angle and an aligned timing of the liquid crystal molecules in the LCD panel 171, a driving signal and a timing signal are applied to the gate lines and the data lines. As shown in FIG. 1, the data TCP 178 is one kind of flexible PCB and is coupled to the source side of the LCD panel 171 to decide an applying timing of the data driving signal and the gate TCP 174 is one kind of flexible PCB and is coupled to the gate side of the LCD panel 171 to decide timing of the gate driving signal.

The data PCB 176 is coupled to the data TCP 178 to receive an image signal from an external device and apply driving signals to the data lines. The gate PCB 175 is coupled to the gate TCP 174 to apply driving signals to the gate lines.

The data PCB 176 includes a source part to receive an image signal generated from an external information processing unit such as a computer and apply data driving signals to the data lines of the LCD panel 171. The gate PCB 175 includes a gate part to apply gate driving signals to the gate lines of the LCD panel 171. In other words, the data PCB 176 and the gate PCB 175 generate data driving signals, gate driving signals and plural timing signals for applying these data driving signals and gate driving signals with proper timing. At this time, the gate driving signals are applied to the gate lines of the LCD panel through the gate TCP 174 and the data driving signals are applied to the data lines of the LCD panel through the date TCP 178.

Below the display unit 170, a backlight assembly 150 is disposed. The backlight assembly 150 includes: a lamp unit 160 disposed at one side of the LCD module 130, for emitting a light; a light guiding plate 152 for guiding the light emitted from the lamp unit 160 toward the display unit 170 to change the light path; a plurality of optical sheets 153 for making uniform the luminance of the light emitted from the light guiding plate 152; and a reflector plate 154 disposed beneath the light guiding plate 152, for reflecting the light leaked from the light guiding plate 152 to enhance the light efficiency.

The display unit 170 and the backlight assembly 150 are fixedly accommodate within a molded frame 131. A chassis 140 covers the outer edges of the mold frame 131 to prevent the display unit 170 from being dislodged.

FIG. 2 is a perspective view of a lamp unit including a power supply line connected to the lamp in the LCD of FIG. 1.

Referring to FIG. 2, the lamp unit 160 includes: a lamp 161 for generating a light in response to an external power; a lamp cover (not shown in FIG. 2) covering and protecting the lamp 161 and for reflecting the light of the lamp 161 toward the light guiding plate 152; power supply lines 163 and 164 each of which one end is respectively connected to both terminals of the lamp 161; and a connector 165 to which the other ends of power supply lines 163 and 164 are respectively connected, for connecting the power supply lines 163 and 164 with an external power supply unit for supplying power to the lamp 161. In order to maintain the position of the lamp 161 inserted within the lamp cover, lamp holders 162a and 162b are provided at portions where both ends of the lamp 161 are respectively connected to the ends of the power supply lines 163 and 164.

The power supply lines 163 and 164 are divided into a hot electrode line 163 to which a high voltage is applied and a cold electrode line 164 to which a low voltage is applied. It is noted that the hot electrode line 163, as shown in FIG. 2, is shorter than the cold electrode line 164. This is due to the following reason.

The hot electrode fine 163 and the cold electrode line 164 are extracted toward one side direction of the lamp unit 160 and are then connected to the connector 165. Then, if the hot electrode line 163 is made longer than the cold electrode line 164 and the connector 165 is directed toward the cold electrode line 164, a peripheral circuit may be damaged by high temperature due to heat generated from the hot electrode line 163.

Hereinafter, an example of the hot electrode line 163 is explained.

As shown in FIG. 3A, the connector terminal 166 is coupled to one end of the hot electrode line 163 in a screwing manner. The body portion of the connector terminal 166 is formed in an integral structure with an open structure such that the other end of the connector terminal 166 is coupled to a power terminal of an external power unit that is inserted from a direction facing the hot electrode line 163.

A hanging jaw 166a is integrally formed at the rear surface of the body portion.

As shown in FIG. 3B, the connector housing 167 has a through hole into which the connector terminal 166 is inserted Referring to FIGS. 2, 3A and 3B the connector terminals 166 are respectively connected to the hot electrode line 163 and the cold electrode line 164 and the connector housing 167 accommodates the connector terminal 166 within a through hole penetrating its body. Referring to the through hole in FIG. 3B, a first inserting hole 167b formed at one end of the through hole and into which the connector terminal 166 is inserted has a diameter greater than a second inserting hole 167c formed at the other end of the through hole and into which a power terminal of an external power unit is inserted. At an inner bottom surface of the connector housing 167, there is provided a hanging projection 167a. The hanging projection 167a is formed at a portion corresponding to the hanging jaw 166a of the connector terminal 168 to prevent the connector terminal 166 as inserted into the connector housing 167 from being dislodged from the connector housing 167.

In other words, referring to FIG. 4, when the connector terminal 166 is inserted into the connector housing 167, the hanging jaw 166a is placed at an engaged position with the hanging projection 167a, to prevent the connector terminal 166 inserted into the connector housing 167 from being dislodged from the connector housing 167.

However, since the rear surface of the connector terminal 166 having the hanging jaw 166a is formed in the shape of a straight line, it is difficult to securely couple the hanging jaw 166a with the hanging projection 167a considering movement space of the connector terminal 166 within the connector housing 167. Especially if the hanging projection 167a is worn (due to the repeated movement of the hot electrode line 166, tensile stress applied to the hot electrode line 166 when the connector is coupled or separated, and so on), the connector terminal 166 may be easily dislodged with ease from the connector housing 167, such dislodging being undesirable.

SUMMARY OF THE INVENTION

Accordingly, it is an object of the present invention to provide a connector capable of preventing the connector terminal inserted into the connector housing from being dislodged.

It is another object of the present invention to provide a backlight assembly having a connector capable of accomplishing the above object.

It is further another object of the present invention to provide an LCD having a backlight assembly lamp unit provided with a connector capable of accomplishing the above object.

To accomplish the above objects, the invention provides a connector that comprises a housing having a through hole and a hanging projection formed at an inner bottom surface of the through hole and a body portion inserted into the through hole from one side opening of the through hole, for providing power supply line with a power supplied through the other side opening of the through hole. The body portion includes a joint portion for fixing the body portion to the power supply line, a head portion having a hanging jaw engaged with the hanging projection of the housing, (advantageously preventing the body portion from being dislodged), and a connection portion formed with an inclination that is negatively inclined along its insertion direction and faces the inner bottom surface of the housing, the head portion thereby connected with the joint portion.

According to another aspect of the present invention, a backlight assembly lamp unit comprises a lamp for generating a light, a power supply line of which one end is connected to the lamp, and a connector connected to the other end of the power supply line, for providing external power to the lamp through the power supply line. The connector comprises a housing having a through hole and a hanging projection formed at an inner bottom surface of the through hole and a body portion inserted into the through hole from one side opening of the through hole, for providing the power supplying line with the external power through the power supply line. The body portion includes a joint portion for fixing the body portion to the power supply line, a head portion having a hanging jaw engaged with the hanging projection of the housing, for preventing the body portion from being deviated, and a connection portion formed with an inclination that is negatively inclined along its insertion direction and faces with the inner bottom surface of the housing, for connecting the head portion with the joint portion.

According to yet another aspect of the present invention, an LCD includes a lamp for generating a light, a power supply line of which one end is connected to the lamp, a connector connected to the other end of the power supply line, for providing an external power to the lamp through the power supply line, a light guiding unit for guiding the light generated from the lamp, and a display unit for displaying an image in response to the light guided by the light guiding unit. The connector includes a housing having a through hole and a hanging projection formed at an inner bottom surface of the through hole, and a body portion inserted into the through hole from one side opening of the through hole, for providing the external power to the lamp through the power supply line. The body portion includes a joint portion for fixing the body portion to the power supply line, a head portion having a hanging jaw engaged with the hanging projection of the housing, (advantageously preventing the body portion from being dislodged), and a connection portion a connection portion formed with an inclination that is negatively inclined along its insertion direction and faces with the inner bottom surface of the housing, for connecting is the head portion thereby connected with the joint portion.

Preferably, a distance between the head portion and the inner bottom surface of the housing on which the hanging projection is formed is different from that between the joint portion and the inner bottom surface of the housing and that between the connection portion and the inner bottom surface of the housing.

Preferably, the inclination has an inclined angle within a range of 9 degrees to 10 degrees.

Thus, the connection portion acting as a lever does not allow movement of the hot or cold electrode line, and tensile stress due to repeated coupling of the connector is not transferred, thereby preventing the connector terminal of the connector from being dislodged from the housing.

BRIEF DESCRIPTION OF THE DRAWINGS

The above objects and other advantages of the present invention will become more apparent by describing in detail the preferred embodiments thereof with reference to the accompanying drawings, in which:

FIG. 3A is a side view of a terminal of the connector used in the lamp unit of FIG. 2;

FIG. 8A is a side view of the connector terminal in the connector of FIG. 7;

FIG. 8B is a sectional view of the connector housing taken along the A1–A2 line of FIG. 7.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein.

Figure 1:
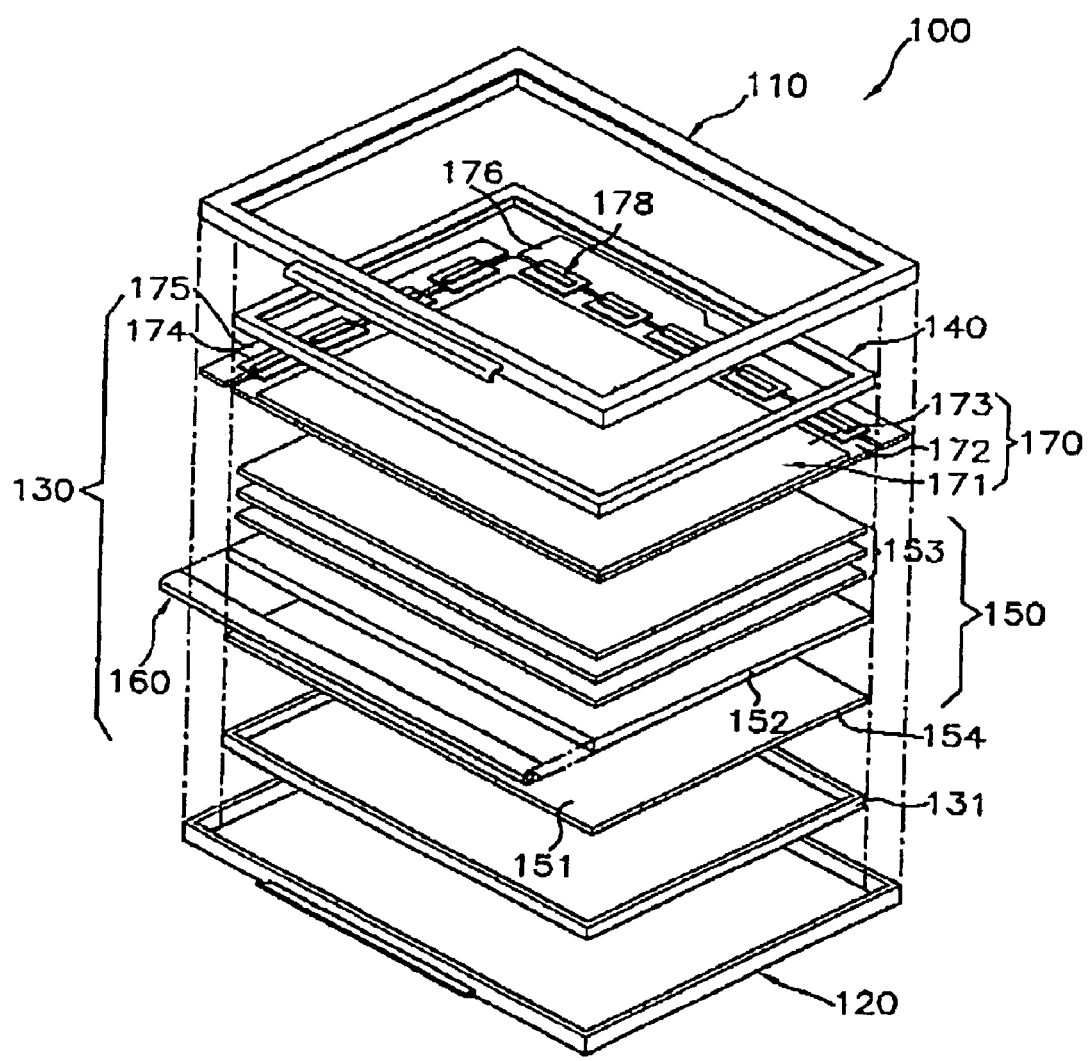
FIG. 1 is a exploded perspective view of a conventional LCD.
Figure 2:
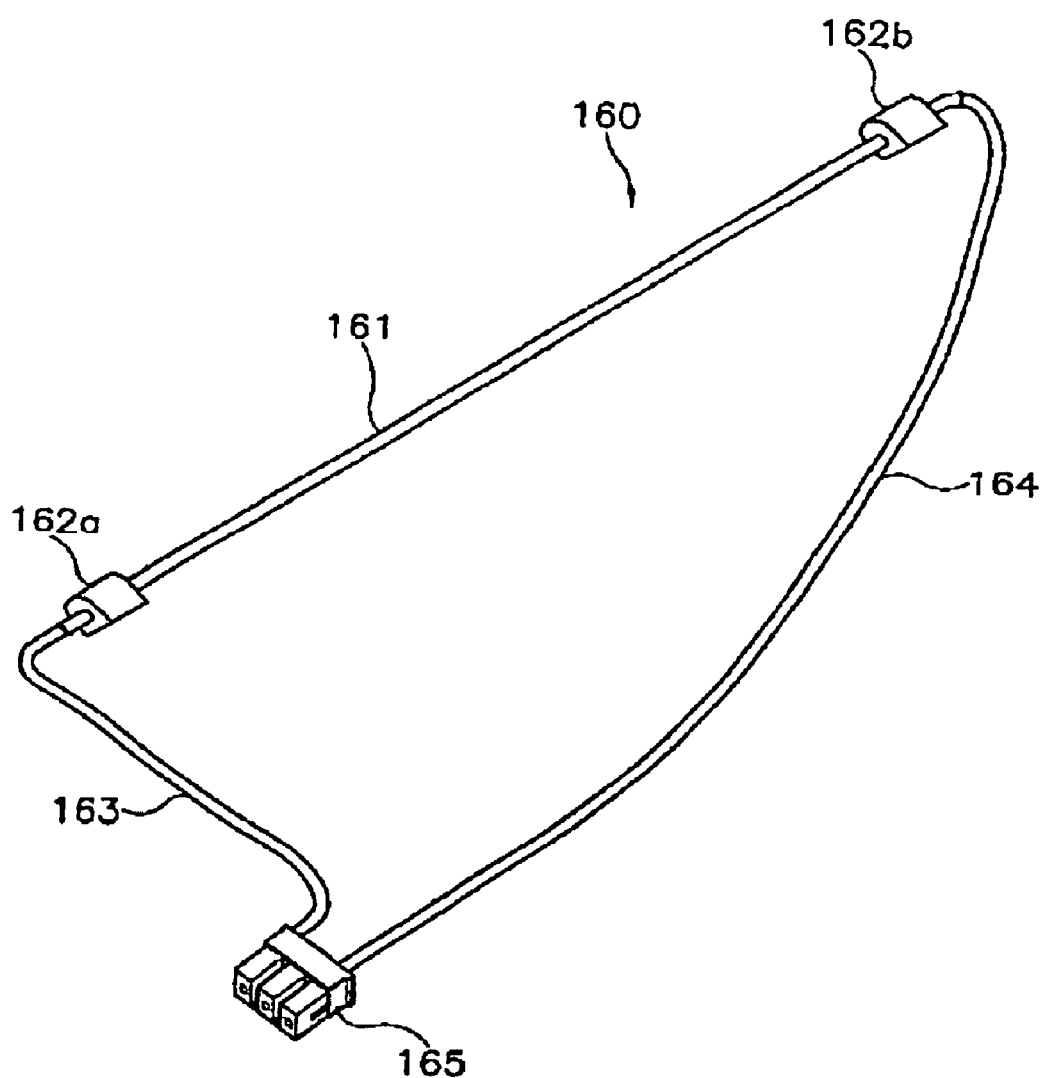
FIG. 2 is a perspective view of a lamp unit including a power supply line connected to the lamp in the LCD of FIG. 1.
Figure 5:
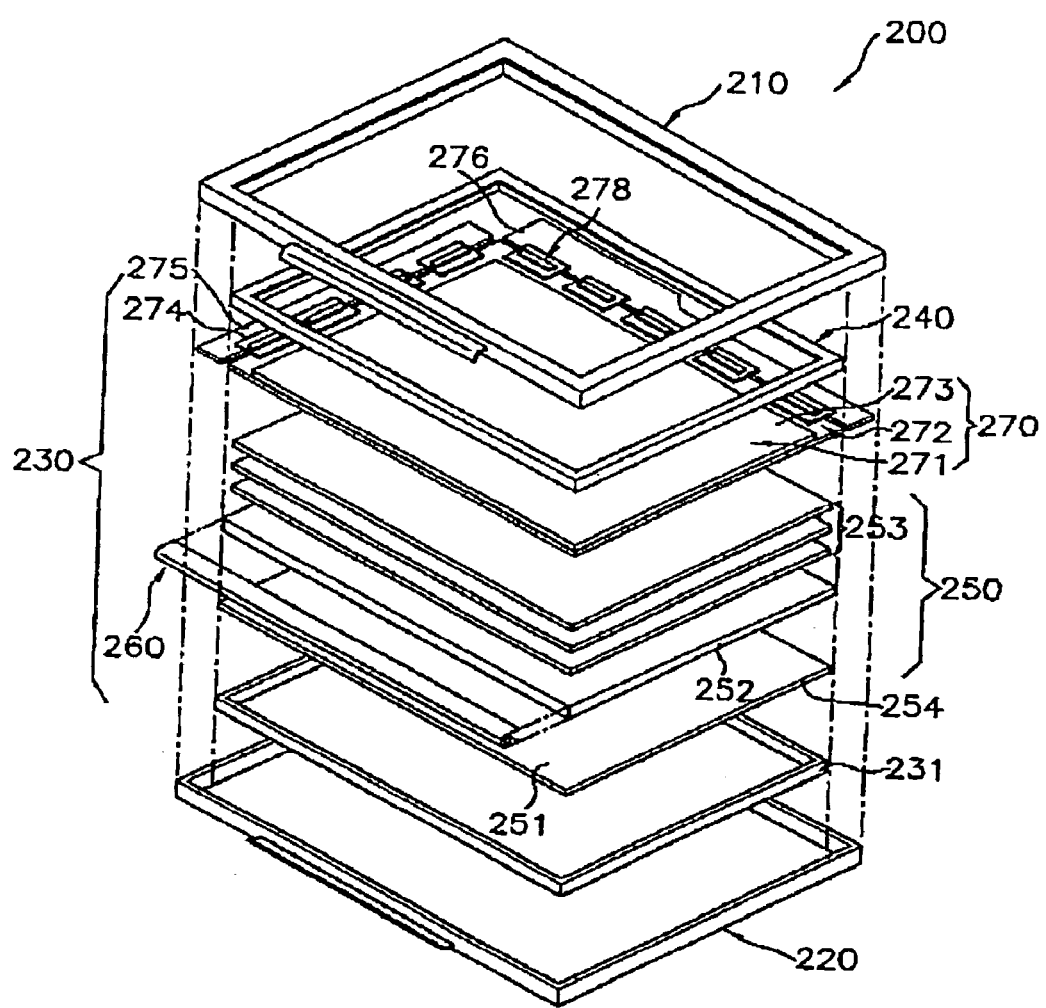
FIG. 5 is a disassembled perspective view of an LCD in accordance with one preferred embodiment of the present invention.

FIG. 5 is an exploded perspective view of an LCD 200 in accordance with one preferred embodiment of the present invention. In FIG. 5, LCD module 230, front case 210, rear case 220, display unit 270, backlight assembly 250, LCD panel 271, data printed circuit board (PCB) 276, data tape carrier package (TCP) 278, gate printed circuit board (PCB) 275, gate tape carrier package (TCP) 274, TFT substrate 272, color filter substrate 273, the liquid crystal (not shown) interposed between the TFT substrate 272 and the color filter substrate 273, light guiding plate 252, and reflector plate 254 may be understood by reference to their respective counterparts in FIG. 1 which are correspondingly numbered, i.e., LCD module 130, front case 110, etc.

Referring to FIG. 5, the display unit 271 and the backlight assembly 250 are fixedly accommodated within a molded frame 231 acting as a receiving container. A chassis 240 covers the outer edges of the molded frame 231 and allows the data PCB 276 and the gate PCB 275 to be bent to the outer face of the molded frame 231. The chassis 240 also allows the data PCB 276 and the gate PCB 275 to be fixed to the rear surface of the molded frame 231 such that the display unit 271 is prevented from being dislodged.

Figure 6:
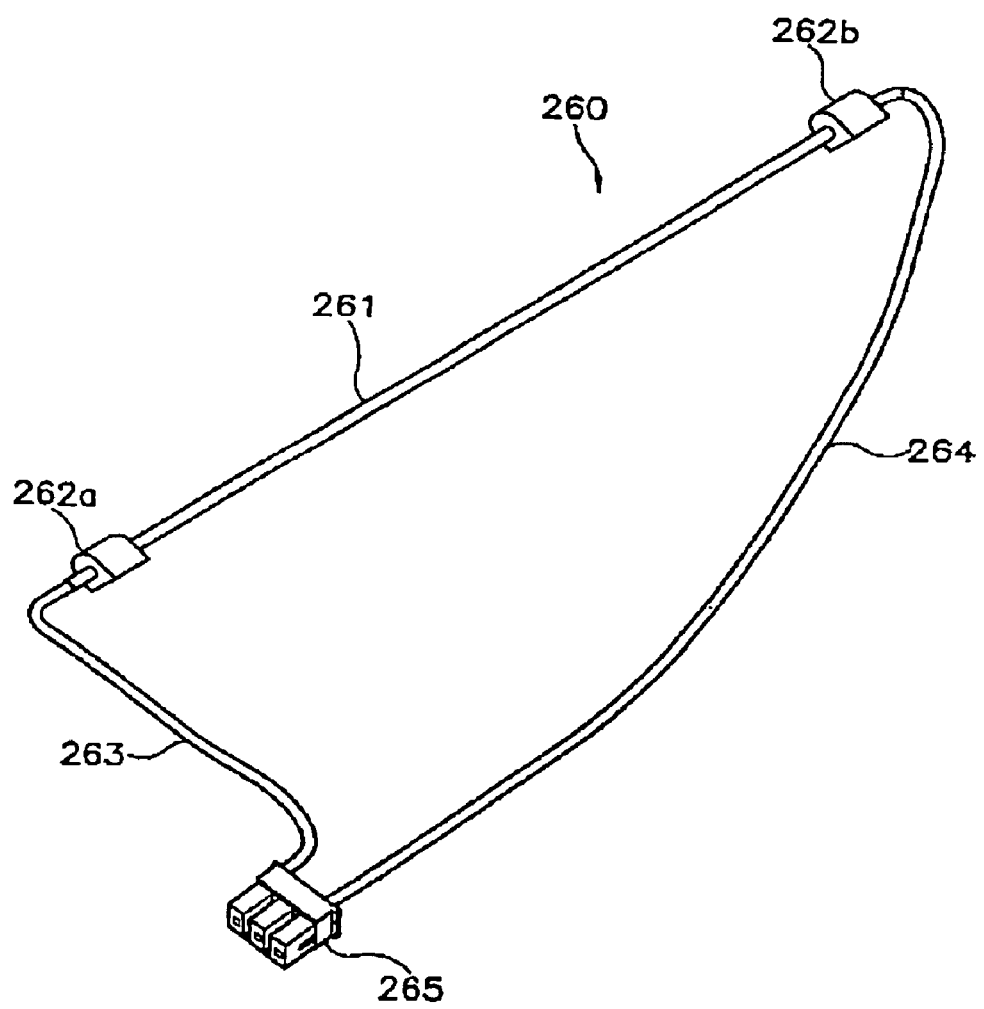
FIG. 6 is a perspective view of a lamp unit including a power supply line connected to the lamp in the LCD of FIG. 5.

FIG. 6 is a perspective view of a lamp unit 260 including a power supply line connected to the lamp in the LCD of FIG. 5.

Figure 3B:
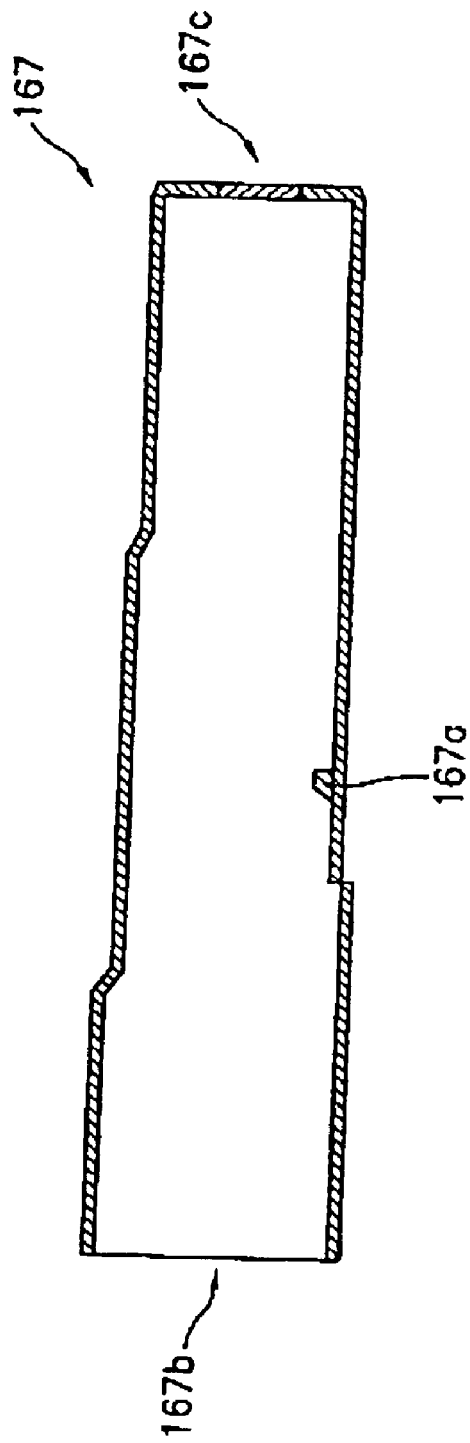
FIG. 3B is a sectional view of a housing in the lamp unit of FIG. 2.
Figure 4:
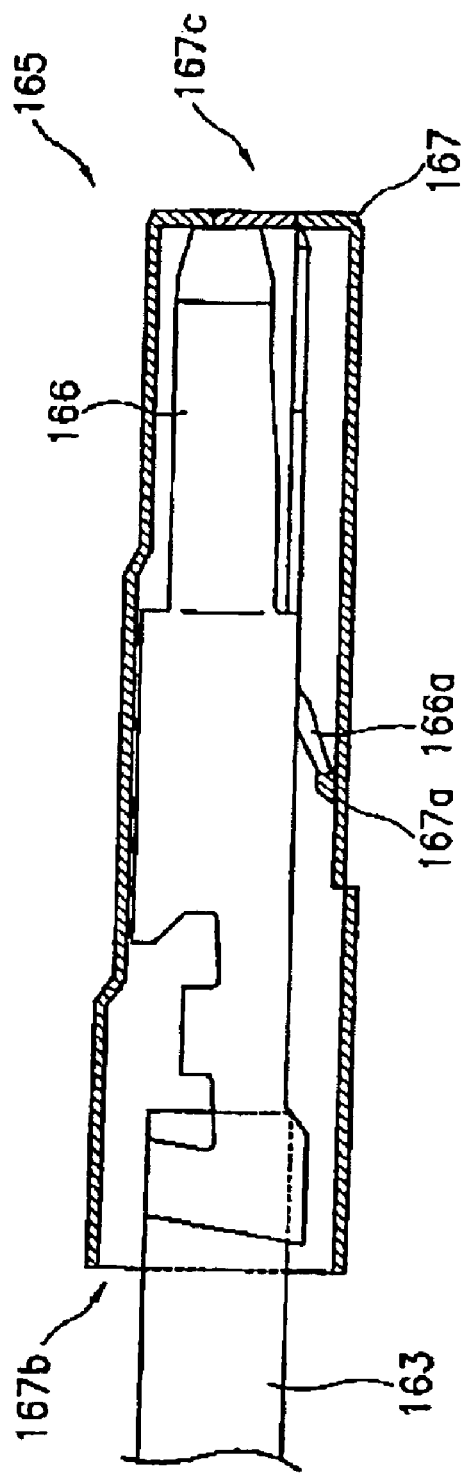
FIG. 4 is a sectional view showing a coupling status of the connector terminal shown in FIG. 3a and the connector housing shown in FIGS. 3A and 3B.

Referring to FIG. 6, lamp 261 and lamp holders 262a, 262b with regard to correspondingly-numbered lamp 161 and lamp holders 162a, 162b in FIG. 3.

In FIG. 6, The lamp unit 260 includes a first power supply line (hereinafter referred to as "hot electrode line") 263 and a second power supply line (hereinafter referred to as "cold electrode line") 264 each of which one end is connected to both terminals of the lamp 261. The other ends of the hot electrode line 263 and the cold electrode line 264 are respectively received inside a connector 265 for connecting the hot electrode line 263 and the cold electrode line 264 with an external power supply unit for supplying a power to the lamp 261.

As shown in FIG. 5, the lamp 261 is accommodated inside the lamp cover (not shown) through an opening of the lamp cover. When the lamp 261 is established at one edge of the light guiding plate 252 of FIG. 5, the cold electrode line 264 is extended along the outer surface of the lamp cover toward the hot electrode line 263. It is noted that the hot electrode line 263 is shorter in length relative to the cold electrode line 264. This is because a high voltage is applied to the hot electrode line 263 and a low voltage relative to the high voltage is applied to the cold electrode line 264.

To enhance the assembly capability of the LCD modules 230 of FIG. 5, it is generally preferred to extract either the hot electrode line 263 or the cold electrode line 264 toward any one side of the lamp unit 260 and allow the extracted one electrode line to be received within the connector 265.

If the hot electrode line 263 is formed longer than the cold electrode line 264 and the connector 285 is extracted toward the cold electrode line 264, a peripheral circuit may be damaged due to heat of high temperature generated from the hot electrode line to which a high voltage is applied. Accordingly, it is preferred that the cold electrode line 264 be formed longer than the hot electrode line 263 and the connector 265 be extracted toward the hot electrode line 263.

Figure 7:
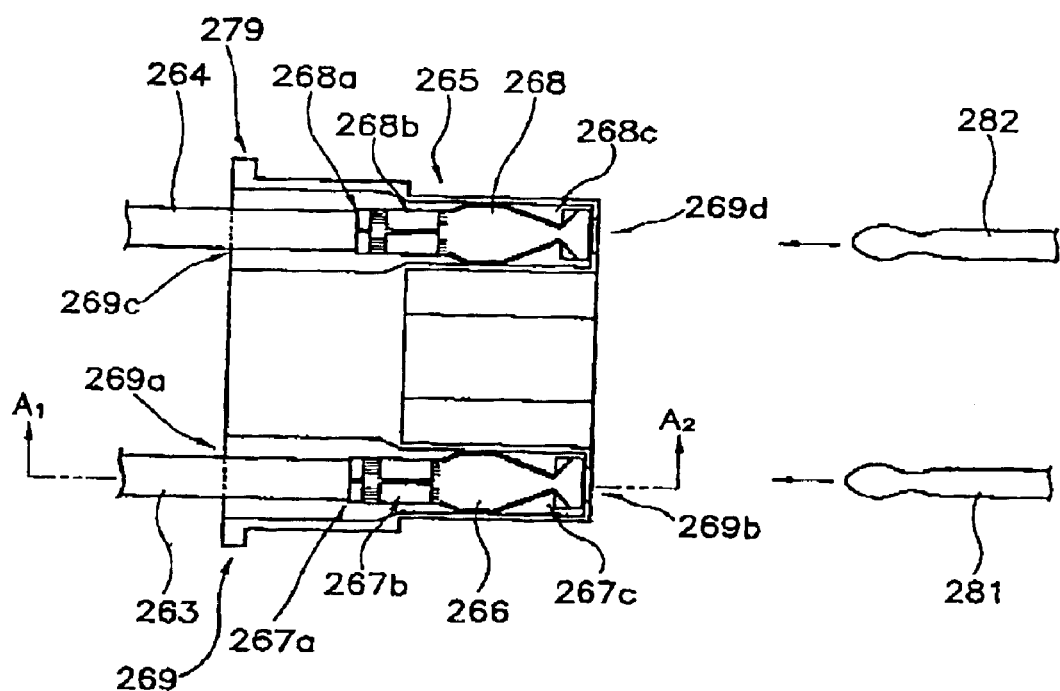
FIG. 7 is a plan view showing a coupling status of a connector housing and a connector terminal in the connector shown in FIG. 6.
Figure 9:
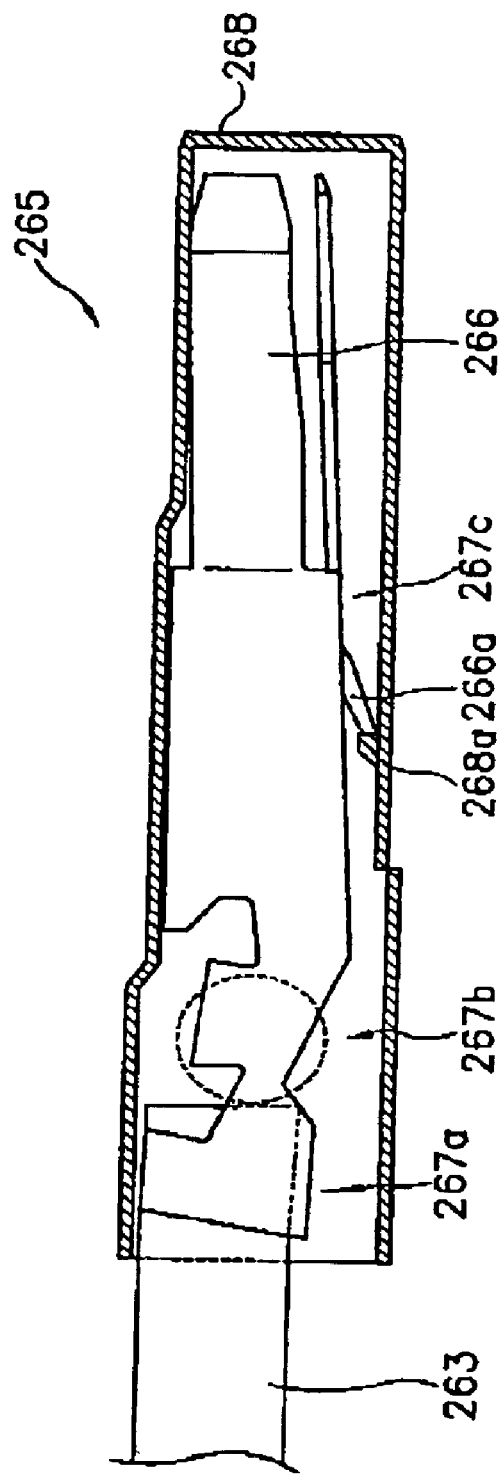
FIG. 9 is a sectional view taken along the line A1–A2 of FIG. 7.

FIG. 7 is a plan view showing a coupling status of a connector terminal and a connector housing in the connector 265 shown in FIG. 6. FIG. 8A is a side view of a connector terminal in the connector of FIG. 7 and FIG. 8B is a sectional view of the housing taken along the A1–A2 line of FIG. 7. FIG. 9 is a sectional view taken along the line A1–A2 of FIG. 7.

Referring to FIG. 7, a first connector housing 269 and a second connector housing 279 are established within the connector 265. Each of the first and second connector housings 269 and 279 has a through hole penetrating its body. The first and second connector housings 269 and 279 have the first and second inserting holes 269a and 269c through which a hot connector terminal 266 and a cold connector terminal 265 are inserted and the third and fourth inserting holes 269b and 269d through which external connector terminals 281 and 282 are inserted. The first and second inserting holes 269a and 269c are greater in diameter than the third and fourth inserting holes 269b and 269d.

One end of the hot electrode line 263 and the cold electrode line 264 is respectively connected with one end of the hot connector terminal 266 and the cold connector terminal 268. In other words, the hot electrode line 263 and the cold electrode line 264 each include multiple conductive lines and a coated member surrounding the conductive lines. The conductive lines are exposed by a selected length from one end. The exposed portion of the conductive lines surrounds the outer circumference of the hot connector terminal 268 such that the exposed portion is in contact with the hot connector terminal 266. The exposed portion of the conductive lines and the outer circumference of the hot connector terminal 266 are jointed at a joint portion 267a.

Each of the hot connector terminal 266 and the cold connection terminal 268 also includes a respective head portion 267c, 268c into which external power terminals 281 and 282 are respectively inserted. The head portion 267c of the hot connector terminal 266 has a curved portion such that the inserted external power terminal 281 does not come out due to movement and maintains a certain coupling force. The hot connector terminal 266 also includes a connection portion 267b that connects the joint portion 267a with the head portion 267c. The connection portion 267b allows the hot electrode line 263 to be electrically connected with the hot connector terminal 266. The cold connector terminal 268 is arranged likewise as the hot connector terminal 266, and head portion 268c, connection portion 268b, and joint portion 268a are understood with reference to the corresponding head portion 267c, etc.

The hot connector terminal 266 and the cold connector terminal 268 electrically coupled with the hot electrode line 263 and the cold electrode line 264 are insertable into the first and second housings 279 through the first and second inserting holes 269a and 269c. When such insertion is performed, as the external power terminals 281 and 282 are inserted into the hot connector terminal 266 and the cold connector terminal 288 through the third and fourth holes 269b and 269d, external power is applied to the lamp 261.

Hereinafter, there will be described a coupling procedure in which the hot connector terminal 266 and the cold connector terminal 268 are installed in the first and second housings 269 and 279 with reference to the accompanying drawings of FIG. 7 through FIG. 9.

As aforementioned, the hot connector terminal 266 and the cold connector terminal 268 are electrically coupled to the hot electrode line 263 and the cold electrode line 264, respectively. The first and second housings 269 and 279 accommodate the hot connector terminal 260 and the cold connector terminal 268 through the first and second inserting holes 269a and 269c. An example of coupling between the hot electrode line 263 and the hot connector terminal 266 is as follows.

As shown in FIG. 7 and FIG. 8A, the hot connector terminal 266 is coupled with one end of the hot electrode line 263 at the joint portion 267a preferably by a jointer. The head portion 267c of the hot connector terminal 266 has an open end such that the head portion 267c is coupled with the external power terminal 281 inserted through the third inserting hole 269b opposite to the inserted direction of the hot electrode line 263.

Also, the hot connector terminal 266 has a hanging jaw 266a formed as one body with the hot connector terminal 266 at the rear surface of the head portion 267c of the hot connector terminal 266.

The connection portion 267b between the joint portion 267a and the head portion 267b is inclined with respect to the bottom surface of the housing 269 as shown in FIG. 8b and FIG. 9. In other words, if the rear face of the head portion 267c is parallel to the bottom face of the housing 269, the connection portion 267b of the hot connector terminal 266 is distant from the bottom ace of the housing 269 compared with the head portion 267c. Here, the inclined angle of the connection portion 267b preferably is in the range of 9 degrees to 10 degrees.

Referring to FIG. 8B, the housing 269 has a hanging projection 268a formed at a predetermined portion of the inner bottom surface of the housing corresponding to the hanging jaw 266a formed at the rear face of the head portion 267c of the hot connector terminal 266. Accordingly, as shown in FIG. 9, when the hot connector terminal 266 is inserted into the housing 269, the hanging jaw 266a is engaged with the hanging projection 268a of the housing 269, to thereby prevent the hot connector terminal 266 from being dislodged from the housing 269.

In addition, as aforementioned, when the connection portion 267b of the hot connector terminal 266 is formed with an inclined angle as mentioned herein, the portion where the hanging jaw 266a is established is placed lower than the front end of the head portion 267c and the joint portion 267a. As a result, the hanging force between the hanging jaw 266a and the hanging projection 268a may become larger.

When the hot connector terminal 266 is inserted into the housing 269, the inclination of the connection portion 267b allows distances between the joint portion 267a and the bottom face of the housing 269 and between the connection portion 267b and the bottom face of the housing 269 to be greater than the distance between the head portion 267c and the bottom face of the housing 269.

Thus, if the joint portion 267a and the connection portion 267b are placed higher than the head portion 267c, when the hot electrode line 263 connected to the hot connector terminal 266 moves, the connection portion 267b acts as a lever and thereby the movement of the hot electrode line 263 is not transferred to the hot connector terminal 266.

Moreover, even when the hot electrode line 263 is subjected to tensile stress due to the repeated coupling of the connector 265, the connection portion 267b acts as a lever, so that the hanging jaw 266a becomes lowered toward the hanging projection 288 of the housing 269.

As described previously, according to the connector, the backlight assembly lamp unit and the LCD provided in the embodiments of the present invention, a hot electrode line and a cold electrode are respectively connected to both ends of a lamp line and their connector terminals are received within a connector housing that is supplied an external power for driving the lamp. These connector terminals include a joint portion coupled to the hot or cold electrode line, a head portion having a hanging jaw engaged with a hanging projection formed at the inner bottom surface of the housing and a connection portion for connecting the head portion with the joint portion and the joint portion. The head portion and the connection portion are formed as one body. The connection portion has an inclined portion that is negatively inclined along its insertion direction and faces the inner bottom surface of the housing, so that the joint portion and the connection portion are higher than the head portion. Thus, the connection portion, by acting as a lever, does not allow movement of the hot or cold electrode line and does not allow tensile stress due to repeated coupling of the connector to be transferred. Thus the connector terminal of the connector is prevented from being dislodged from the housing.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A connector comprising:
    a housing having a through hole and a hanging projection formed at an inner bottom surface of the through hole; and
    a body portion inserted into the through hole, wherein the body portion is a single unit and divided into a plurality of integral portions comprising:
        a head portion having a hanging jaw formed on a bottom surface thereof and engaged with the hanging projection of the housing;
        a connection portion extended from the head position and bent toward an inner top surface of the through hole; and
        a joint portion extended from the connection portion and connected to a power supply wire,
    wherein the bending of the connection portion pushes the head portion and the joint portion toward the inner top surface of the through hole to restrain movement of the body portion in the through hole.

2. The connector of claim 1, wherein the connection portion is bent at an angle of about 9 degrees to 10 degrees.

3. A backlight assembly lamp unit comprising:
    a lamp for generating light;
    a power supply line having a first end is connected to the lamp; and
    a connector connected to a second end of the power supply line, wherein the connector comprises:
        a housing having a through hole and a hanging projection formed at an inner bottom surface of the through hole; and
        a body portion inserted into the through hole from one side opening of the through hole, wherein the body portion is a single unit and divided into a plurality of integral portions comprising:
            a head portion having a hanging jaw engaged with the hanging projection of the housing;
            a connection portion extended from the head portion and bent toward an inner top surface of the through hole; and
            a joint portion extended from the connection portion and connect to the second end of the power supply line,
    wherein the bending of the connection portion pushes the head portion and the joint portion toward the inner top surface of the through hole to restrain movement of the body portion in the through hole.

4. The connector of claim 3, wherein the connection portion is bent at an angle of about 9 degrees to 10 degrees.

5. The backlight assembly lamp unit of claim 3, wherein a distance between the head portion and the inner bottom surface of the through hole is different from a distance between the joint portion and the inner bottom surface of the through hole and a distance between the connection portion and the inner bottom surface of the through hole.

6. A liquid crystal display (LCD) comprising:
    a lamp for generating light;
    a power supply line having a first end connected to the lamp;
    a connector connected to a second end of the power supply line;
    a light guiding unit for guiding the light generated from the lamp; and
    a display unit for displaying an image in response to the light guided by the light guiding unit,
    wherein the connector comprises:
        a housing having a through hole and a hanging projection formed at an inner bottom surface of the through hole; and
        a body portion inserted into the through hole from one side opening of the through hole, for providing the external power to the lamp through the power supply line, wherein the body portion is a single unit and divided into a plurality of integral portions comprising:
            a head portion having a hanging jaw engaged with the hanging projection of the housing;
            a connection portion extended from the head portion and bent toward an inner upper surface of the housing; and
            a joint portion extended from the connection portion and connected to the second end of the power supply line,
    wherein the bending of the connection portion pushes the head portion and the join portion toward the inner top surface of the through hole to restrain movement of the body portion in the through hole.

7. The LCD of claim 6, wherein the connection portion is bent at an angle of about 9 degrees to 10 degrees.

8. The LCD of claim 6, wherein a distance between the head portion and the inner bottom surface of the through hole is different from a distance between the joint portion and the inner bottom surface of the through hole and a distance between the connection portion and the inner bottom surface of the through hole.

9. A connector comprising:
    a housing having a through hole and a hanging projection formed on an inner bottom surface of the through hole; and
    a body portion inserted into the through hole, wherein the body portion is a single unit and divided into a plurality of integral portions comprising:
        a head portion having a hanging jaw formed on a bottom surface thereof and engaged with the hanging projection of the housing;
        a connection portion extended from the head portion and bent toward an inner top surface of the through hole; and
        a joint portion extended from the connection portion and connected to a power supply wire,
    wherein the head portion and the joint portion are proximate to the inner top surface of the through hole to restrain movement of the body portion in the through hole.

* * * * *